(12) United States Patent
Pedrami et al.

(10) Patent No.: US 10,392,099 B2
(45) Date of Patent: Aug. 27, 2019

(54) SYSTEM AND METHOD FOR AIRCRAFT PROPELLER CONTROL

(71) Applicant: PRATT & WHITNEY CANADA CORP., Longueuil (CA)

(72) Inventors: Reza Pedrami, Montreal (CA); James Jarvo, Saint-Bruno (CA)

(73) Assignee: PRATT & WHITNEY CANADA CORP., Longueul (CA)

( * ) Notice: Subject to any disclaimer, the term of this patent is extended or adjusted under 35 U.S.C. 154(b) by 58 days.

(21) Appl. No.: 15/599,049

(22) Filed: May 18, 2017

(65) Prior Publication Data
US 2018/0334242 A1 Nov. 22, 2018

(51) Int. Cl.
*B64C 11/38* (2006.01)
*B64C 11/40* (2006.01)
*B64C 27/64* (2006.01)
*B64D 27/10* (2006.01)

(52) U.S. Cl.
CPC ............ *B64C 11/385* (2013.01); *B64C 11/40* (2013.01); *B64C 27/64* (2013.01); *B64D 27/10* (2013.01)

(58) Field of Classification Search
CPC ........ B64C 11/385; B64C 11/40; B64D 27/10
See application file for complete search history.

(56) References Cited

U.S. PATENT DOCUMENTS

| | | | |
|---|---|---|---|
| 4,161,658 A | 7/1979 | Patrick | |
| 5,019,006 A | 5/1991 | Schneider et al. | |
| 5,174,718 A * | 12/1992 | Lampeter | B64C 11/38 416/157 R |
| 5,213,471 A | 5/1993 | Miller et al. | |
| 5,331,559 A * | 7/1994 | High | B64C 11/303 244/181 |
| 6,059,528 A * | 5/2000 | Danielson | B64C 11/303 416/153 |
| 2003/0002983 A1* | 1/2003 | Perkinson | B64C 11/40 416/48 |

FOREIGN PATENT DOCUMENTS

| EP | 311277 | 4/1989 |
|---|---|---|
| EP | 394181 | 10/1990 |

* cited by examiner

*Primary Examiner* — Aaron L Troost
(74) *Attorney, Agent, or Firm* — Norton Rose Fulbright Canada LLP

(57) ABSTRACT

A system and method for controlling an aircraft propeller are provided. In anticipation of a condition in which a parameter related to an angle of a plurality of blades of the propeller reaches a value beyond a predetermined threshold, a first control signal is output comprising instructions to actuate a feather valve operatively coupled to an actuator configured to adjust the angle in response to hydraulic pressure, thereby causing the feather valve to provide the hydraulic pressure to the actuator and the angle to be adjusted for bringing the parameter towards the threshold. When the parameter reaches the predetermined threshold, a second control signal is output comprising instructions to hold the feather valve at a position in which the hydraulic pressure is withheld from the actuator, thereby causing the angle to remain unchanged.

16 Claims, 6 Drawing Sheets

SYSTEM AND METHOD FOR AIRCRAFT PROPELLER CONTROL

TECHNICAL FIELD

The application relates generally to aircraft propeller control.

BACKGROUND OF THE ART

In current aircraft propeller systems, a propeller fly ball overspeed governor is typically provided to limit the speed of the propeller. This hardware is used as a secondary propeller control mechanism independent from a primary mechanism, which may be a mechanical flyweight governor or an electro hydraulic control system. In order to protect the propeller from going below a minimum blade angle, auxiliary low pitch stop solenoid systems are also typically integrated in the Propeller Control Unit (PCU). These mechanisms however add weight, additional parts, and complexity to the PCU hardware.

In other applications, the propeller's feather valve is modulated to avoid overspeed. However, this method is only applicable to feather valves whose position can be controlled through bandwidth modulation of their command, e.g. to spring-loaded feather valves. This therefore imposes a certain hydraulic design to the PCU hardware.

There is therefore a need for improved aircraft propeller control system and methods.

SUMMARY

In one aspect, there is provided a system for controlling an aircraft propeller. The system comprises an actuator for adjusting an angle of a plurality of blades of the aircraft propeller in response to hydraulic pressure, a feather valve operatively coupled to the actuator and configured to selectively provide the hydraulic pressure to the actuator, a memory, and a processing unit coupled to the memory and configured to output, in anticipation of a condition in which a propeller parameter related to the angle reaches a value beyond a predetermined threshold, a first control signal comprising instructions to actuate the feather valve, thereby causing adjustment of the angle and of the parameter towards the threshold, and, when the parameter reaches the threshold, output a second control signal comprising instructions to hold the feather valve at a position in which the hydraulic pressure is withheld from the actuator, thereby causing the angle to remain unchanged.

In another aspect, there is provided a method for controlling an aircraft propeller having a plurality of blades, the propeller comprising an actuator for adjusting an angle of the plurality of blades in response to hydraulic pressure and a feather valve operatively coupled to the actuator and configured to selectively provide the hydraulic pressure to the actuator. The method comprises outputting, in anticipation of a condition in which a propeller parameter related to the angle reaches a value beyond a predetermined threshold, a first control signal comprising instructions to actuate the feather valve, thereby causing adjustment of the angle and of the parameter towards the predetermined threshold, and, when the parameter reaches the threshold, output a second control signal comprising instructions to hold the feather valve at a position in which the hydraulic pressure is withheld from the actuator, thereby causing the angle to remain unchanged.

In a further aspect, there is provided a computer readable medium having stored thereon program code executable by a processor for outputting, in anticipation of a condition in which a parameter related to an angle of a plurality of blades of an aircraft propeller reaches a value beyond a predetermined threshold, a first control signal comprising instructions to actuate a feather valve operatively coupled to an actuator configured to adjust the angle in response to hydraulic pressure, thereby causing the feather valve to provide the hydraulic pressure to the actuator and the angle to be adjusted for bringing the parameter towards the threshold, and, when the parameter reaches the predetermined threshold, outputting a second control signal comprising instructions to hold the feather valve at a position in which the hydraulic pressure is withheld from the actuator, thereby causing the angle to remain unchanged.

DESCRIPTION OF THE DRAWINGS

Reference is now made to the accompanying figures in which.

DETAILED DESCRIPTION

Figure 1:
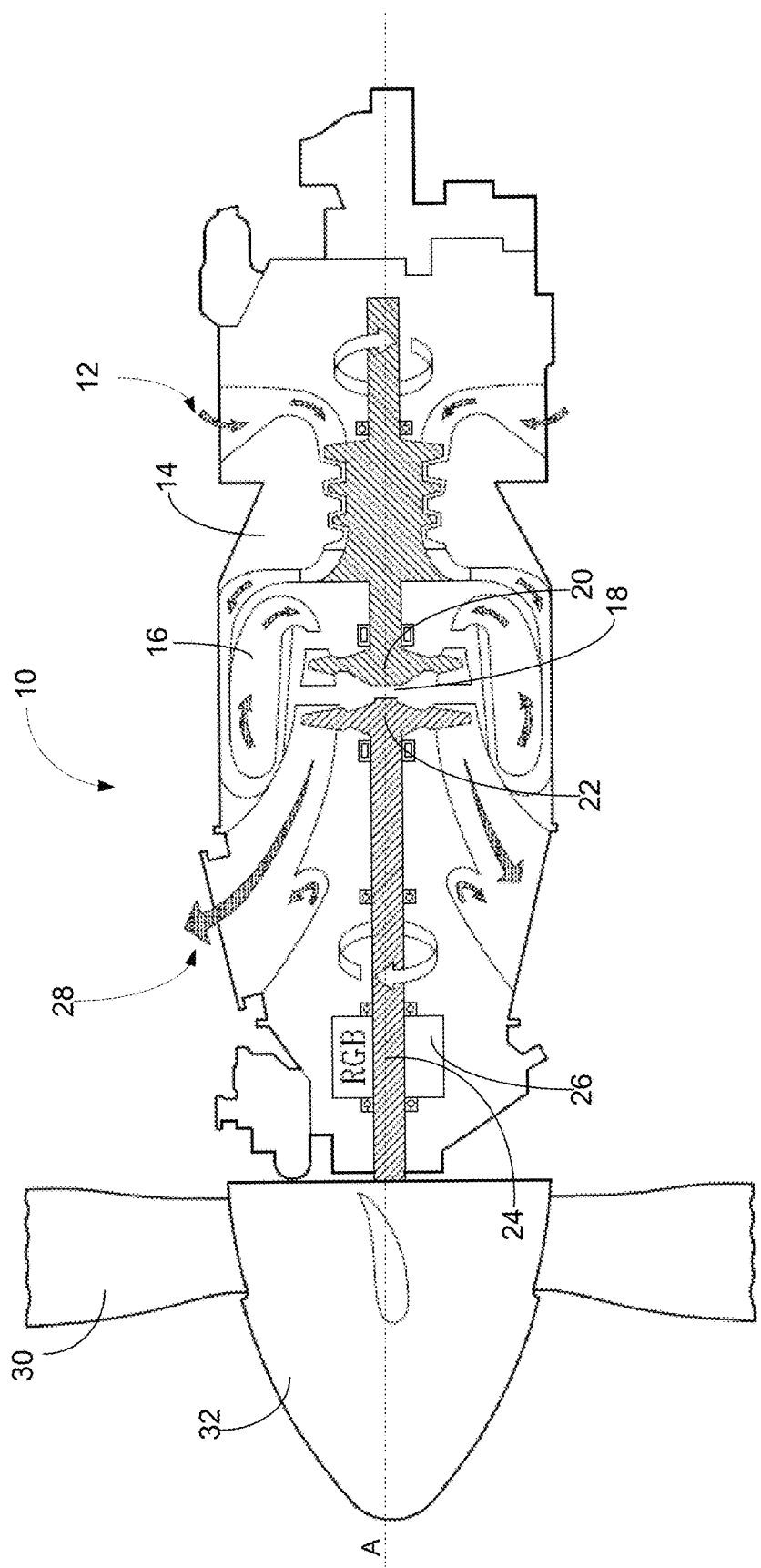
FIG. 1 is a schematic cross-sectional view of a gas turbine engine, in accordance with an illustrative embodiment.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a propeller shaft axis A through a reduction gearbox 26. Hot gases may then be evacuated through exhaust stubs 28. The gas generator (not shown) of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades (not shown) connected to a hub (not shown) by any suitable means and extending radially therefrom. The blades are also each rotatable about their own radial axes through a plurality of blade angles, which can be changed to achieve modes of operation, such as feather, full reverse, and forward thrust.

Figure 2:
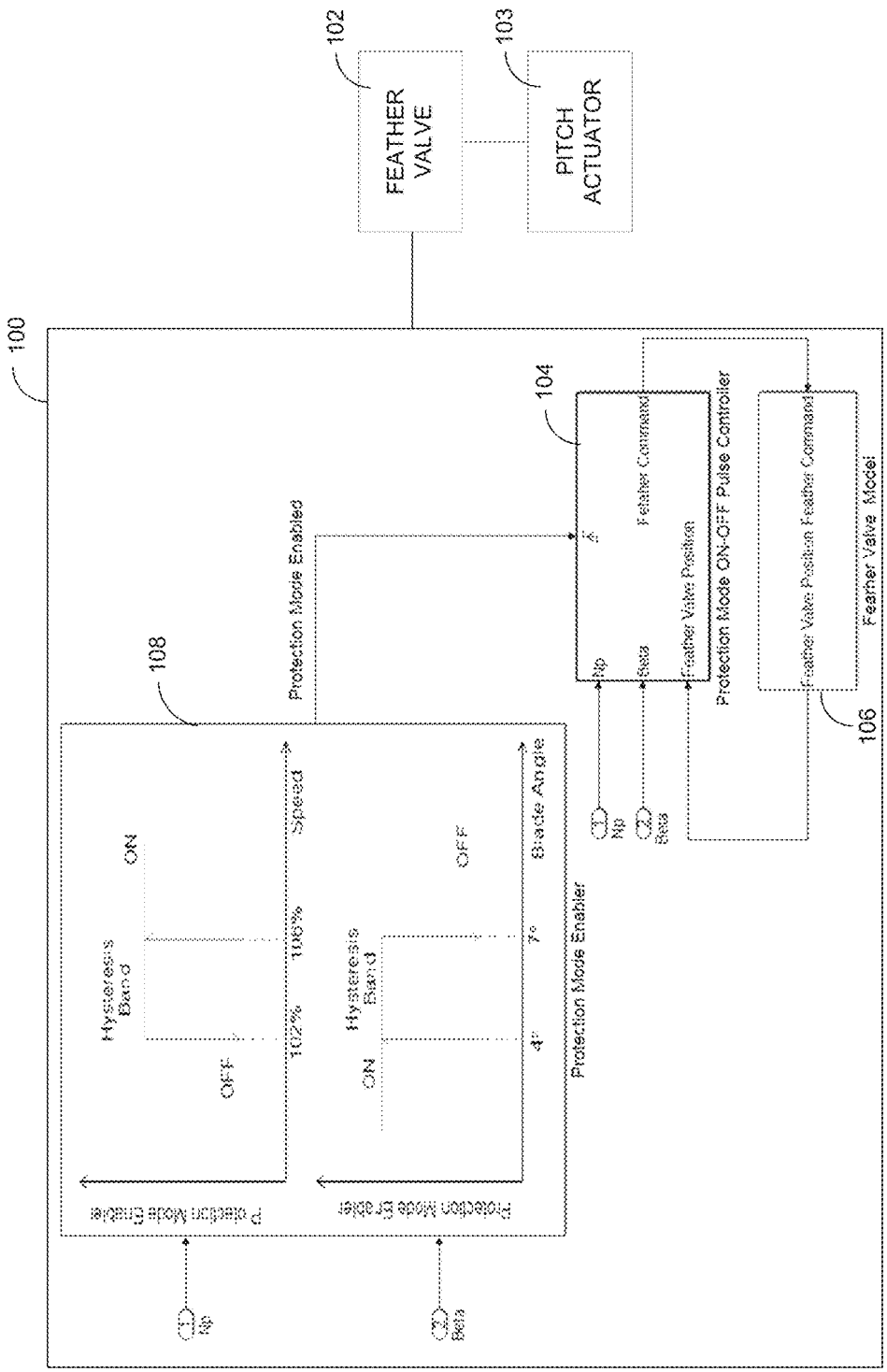
FIG. 2 is a block diagram of a system for controlling an aircraft propeller, in accordance with an illustrative embodiment.

Referring now to FIG. 2, a system 100 for controlling the rotor 30 (i.e. the aircraft propeller) will now be described. In one embodiment, the propeller 30 is a hydro mechanical propeller and the system is an electronic control system used to protect the propeller 30 from overspeed and/or from going below a minimum blade angle. The control system 100 may comprise a digital computer or Engine Control Unit (ECU) (not shown) using a Central Processing Unit (CPU) (not shown). As will be discussed further below, the control system 100 may then be implemented as a processor-based system where the term processor may refer to a microprocessor, application specific integrated circuits (ASIC), logic circuits, or any other suitable processor or circuit know to those skilled in the art.

As will be discussed further below, in order to control the propeller speed and/or blade angle, the control system 100 modulates a feather valve 102 provided in a Propeller Control Unit (PCU, not shown) to provide more controllability on the propeller system. The feather valve 102 is illustratively in fluid communication with a pitch actuator 103, which is configured to adjust the angle of the propeller blades in response to hydraulic pressure. Using the control system 100, the feather valve 102 is bandwidth modulated ON and OFF to control the flow of fluid (e.g. oil) through the propeller and accordingly adjust the propeller speed and/or blade angle. It should be understood that, because the control system 100 relies on the feather valve dynamics and hydraulic circuit of the PCU to control the feather valve 102, the control system 100 may be applied to various types of feather valve 102, including, but not limited to, spring-loaded valves, two-port solenoid valves, three-port solenoid valves, and the like.

In operation, when actuated in response to a control signal (also referred to herein as a feather command generated as a pulse width modulating signal) from the control system 100, the feather valve 102 is moved (e.g. spools) between a fully closed position and a fully open position to selectively provide hydraulic pressure to the pitch actuator 103. For this purpose, the feather valve 102 is operatively coupled to a servo valve (not shown), which is disposed in selective fluid communication with the pitch actuator 103. When in the fully closed position, the feather valve 102 allows the flow of metered oil from the servo valve to the pitch actuator 103, thereby providing the hydraulic pressure and causing the blade angle to be adjusted accordingly. When the feather valve 102 has traveled halfway between the fully closed position and the fully open position (i.e. has reached a position referred to herein as the pitch lock position), the feather valve 102 restricts the oil flow from the servo valve, thereby withholding the hydraulic pressure and preventing further adjustment of the blade angle. The feather valve 102 also begins to drain the propeller 30 through the propeller pitch change mechanism (e.g. the pitch change actuator 103), causing the propeller blades to move towards feather angle. When the feather valve 102 reaches the fully open position, maximum drainage is available while the servo valve path is fully closed.

In one embodiment illustrated in FIG. 2, the control system 100 comprises an ON-OFF pulse controller unit 104 configured to generate the feather command for actuating the feather valve 102 and an optional feather valve model unit 106 configured to estimate a current position of the feather valve 102 based on the feather command. The ON-OFF pulse controller unit 104 generates an initial feather command in anticipation (i.e. before occurrence) of a condition in which a propeller parameter (e.g. propeller speed or blade angle) exceeds a predetermined threshold. In this manner, the feather valve 102 can be actuated at the right time to prevent the condition from occurring. For example and as will be discussed further below, the ON-OFF pulse controller unit 104 generates the initial feather command when it is determined that the propeller speed is expected to exceed a maximum speed threshold or a propeller blade angle is expected to be below a minimum blade angle threshold. The initial feather command is then sent to the feather valve 102, which is actuated accordingly, causing the propeller parameter to be adjusted towards the threshold. For example, actuation of the feather valve 102 causes the propeller to go to coarse pitch and the propeller speed to droop and fall within a desired band.

The propeller parameter and feather valve position are continuously monitored in real-time. As will be discussed further below, in one embodiment, the initial feather command is used by the feather valve model unit 106 to estimate the current position of the feather valve 102. It should however be understood that the current position of the feather valve 102 may be obtained from a sensor (not shown) configured to acquire one or more measurements indicative of the current position and output a position feedback signal accordingly. The current feather valve position, once determined, is then fed back to the ON-OFF pulse controller unit 104, which may generate a new feather command accordingly. In particular, the ON-OFF pulse controller unit 104 illustratively generates the new feather command when the propeller speed or blade angle has reached (e.g. is within) the desired threshold. The new feather command may then comprise instructions to cause the feather valve 102 to be held at the pitch lock position, thereby withholding hydraulic pressure to the pitch actuator 103 and preventing further adjustment of the blade angle.

Still referring to FIG. 2, the control system 100 also comprises a protection mode enabler unit 108 for enabling or disabling, based on the propeller speed and/or blade angle, a protection mode of operation of the control system 100. When the protection mode of operation is disabled (or "OFF"), no feather command is generated by the ON-OFF pulse controller unit 104. When the protection mode of operation is enabled (or "ON"), the feather valve 102 is actuated in response to the one or more feather commands generated by the ON-OFF pulse controller unit 104, as will be discussed further below. In one embodiment, in order to avoid interfering with the propeller's normal mode of operation, the protection mode of operation is only enabled when the primary (or normal) mode of operation of the propeller system is degraded due to fault(s) (e.g. the servo valve is faulty, or the like) and the propeller system is unable to clear the fault(s). The mechanism implemented by the control system 100, as described herein, thus serves as a secondary (or backup) control mechanism for operating the propeller pitch change mechanism in the event of a fault or other undesirable propeller condition.

As discussed above, the protection mode is typically enabled when a parameter of the propeller 30 (e.g. the propeller speed (Np) and/or a propeller blade angle (also referred to as beta)), is predicted to reach a value outside of a desired threshold. In the example of FIG. 2, the protection mode is enabled when the propeller speed is expected to be outside of a predetermined speed threshold between 102% and 106%. In particular, the feather command is generated by the ON-OFF pulse controller unit 104 (i.e. the protection mode is enabled) when the propeller speed is expected to exceed 106% and no feather command is generated (i.e. the protection mode is disabled) when the propeller speed is expected to be equal to or below 102%. The protection mode is also enabled when the blade angle is expected to be outside of a predetermined blade angle threshold between 4 and 7 degrees. In particular, the feather command is generated by the ON-OFF pulse controller unit 104 when the blade angle is expected to be below 4 degrees and no feather command is generated when the propeller speed is expected to equal or exceed 7 degrees. It should however be understood that, depending on the applications, other threshold ranges may apply.

Figure 3:
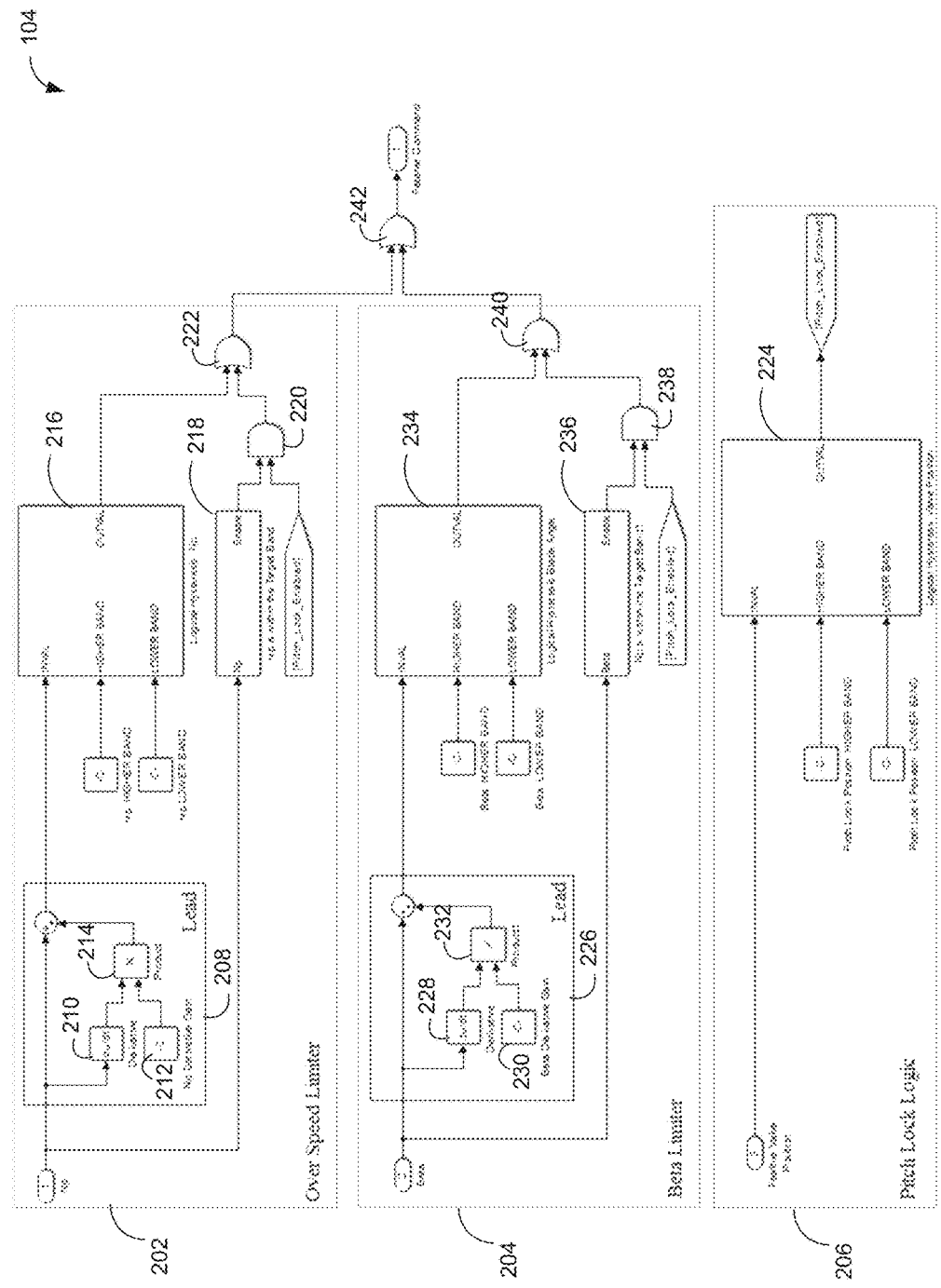
FIG. 3 is a block diagram of the ON-OFF pulse controller of FIG. 2.

Referring now to FIG. 3, the ON-OFF pulse controller unit 104 illustratively comprises an overspeed limiter unit 202, a beta limiter unit 204, and a pitch lock logic unit 206. The overspeed limiter unit 202 is used to predict an overshoot in propeller speed and accordingly generate a feather command that will cause adjustment of the propeller speed towards the desired speed threshold. The beta limiter unit 204 is used to predict a decrease in blade angle below a minimum blade angle threshold and accordingly generate a feather command that will cause adjustment of the blade angle towards the desired blade angle threshold. The pitch lock logic unit 206 is used to generate an ON/OFF command to hold the feather valve (reference 102 in FIG. 3) at the pitch lock position.

The overspeed limiter unit 202 receives (e.g. from any suitable means, such as a speed sensor or the like) a propeller speed signal comprising a measurement of the current propeller speed. The propeller speed measurement is then fed to a lead module 208, which places a lead on the propeller speed signal, i.e. computes a predicted rate of change of propeller speed, to forecast a potential propeller speed overshoot. For this purpose, the lead module 208 uses a derivative unit 210 to compute the derivative of the propeller speed, uses an Np derivative gain unit 212 to represent an amount of prediction time, and uses a multiplier 214 to multiply the speed derivative by the gain. The output of the multiplier 214 is then added to the value of the current propeller speed to generate a value, which is representative of the predicted change in propeller speed over the prediction time time. This value is then fed to a logical hysteresis speed unit 216, which also takes an upper propeller speed threshold (referred to as "Np Higher Band" in FIG. 3) and a lower propeller speed threshold (referred to as "Np Lower Band" in FIG. 3) as input. The logical hysteresis speed unit 216 then compares the predicted change in propeller speed to the upper and lower propeller speed thresholds. If it is determined that the predicted change in propeller speed is within the upper and lower propeller speed thresholds, meaning that no overshoot in speed is anticipated, a Boolean output of the logical hysteresis speed unit 216 is set to a logical zero (or false). Otherwise, If it is determined that the predicted change in propeller speed is beyond the upper and lower propeller speed thresholds, meaning that propeller overspeed is expected, the Boolean output of the logical hysteresis speed unit 216 is set to a logical one (or true).

The speed measurement received at the overspeed limiter unit 202 is also sent to a speed threshold monitoring unit 218, which assesses whether the current propeller speed is within the desired speed threshold or band. This may be achieved by comparing the current speed measurement to the upper and lower propeller speed threshold. If the current propeller speed is within the desired speed threshold, a Boolean output of the speed threshold monitoring unit 218 is set to a logical one. Otherwise, the Boolean output of the speed threshold monitoring unit 218 is set to a logical zero. An AND gate 220 then takes the logical AND of the output of the speed threshold monitoring unit 218 and an input (referred to in FIG. 3 as "Pitch_Lock_Enabled") generated by the pitch lock logic unit 206. The logical OR of the outputs of the logical hysteresis speed unit 216 and of the AND gate 220 is then computed at an OR gate 222.

As can be seen in FIG. 3, the pitch lock logic unit 206 is used to generate an ON/OFF command based on the feather valve position such that it dithers the feather valve 102 within a narrow band of the pitch lock position at which the feather valve 102 is to be held once the propeller speed or blade angle has reached the desired threshold The pitch lock logic unit 206 comprises a logical hysteresis valve position unit 224, which takes as input the current feather valve position (e.g. from the feather valve model unit 106), an upper threshold for the pitch lock position (referred to as "Pitch Lock Position Higher Band" in FIG. 3), and a lower threshold for the pitch lock position (referred to as "Pitch Lock Position Lower Band" in FIG. 3). The pitch lock logic unit 206 then compares the current feather valve position to the upper and lower thresholds for the pitch lock position in order to determine whether the feather valve 102 has reached the pitch lock position. Based on the comparison, the pitch lock logic unit 206 outputs a Boolean (referred to in FIG. 3 as "Pitch_Lock_Enabled"), which is fed to the overspeed limiter 202 and the beta limiter 204. The output of the pitch lock logic unit 206 is a logical zero if the feather valve position is not within the pitch lock position band and a logical one otherwise.

The beta limiter unit 204 operates similarly to the overspeed limiter unit 202. In particular, beta limiter unit 204 receives from any suitable means a measurement of the current blade angle. The blade angle measurement is then fed to a lead module 226, which places a lead on the propeller blade angle signal, i.e. computes a predicted rate of change of propeller blade angle, to forecast a potential condition in which the propeller blade angle is below a minimum blade angle threshold. For this purpose, the lead module 226 uses a derivative unit 228 to compute the derivative of the blade angle, uses a beta derivative gain unit 230 to represent an amount of prediction time, and uses a multiplier 232 to multiply the blade angle derivative by the gain. The output of the multiplier 232 is then added to the value of the current blade angle to generate a value, which is representative of the predicted change in propeller blade angle over the prediction time. This value is then fed to a logical hysteresis blade angle unit 234, which also takes an upper threshold for the propeller blade angle (referred to as "Beta Higher Band" in FIG. 3) and a lower threshold for propeller blade angle (referred to as "Beta Lower Band" in FIG. 3) as input. The logical hysteresis blade angle unit 234 then compares the predicted change in blade to the upper and lower blade angle thresholds. If it is determined that the predicted change in blade angle is within the upper and lower blade angle thresholds, meaning that the blade angle is not anticipated to be below a minimum blade angle, a Boolean output of the logical hysteresis blade angle unit 234 is set to logical zero. Otherwise, If it is determined that the predicted change in blade angle is beyond the upper and lower blade angle thresholds, meaning that the blade angle is anticipated to be below a minimum blade angle, the Boolean output of the logical hysteresis blade angle unit 234 is set to logical one.

The blade angle measurement received at the beta limiter unit 204 is also sent to a beta angle threshold monitoring unit 236, which assesses whether the current blade angle is within the desired blade angle threshold. If this is the case, a Boolean output of the blade angle threshold monitoring unit 236 is set to logical one. Otherwise, the Boolean output of the blade angle threshold monitoring unit 236 is set to logical zero. An AND gate 238 then takes the logical AND of the output of the beta angle threshold monitoring unit 236 and the pitch lock logic input. The blade angle threshold monitoring unit 236 and the AND gate 238 are thus used to determine whether the feather valve (reference 102 in FIG. 2) is to be held at the pitch lock position. The logical OR of the outputs of the logical hysteresis beta angle unit 234 and of the AND gate 238 is then computed at an OR gate 240. The logical OR of the output of the overspeed limiter unit 202 and the output of the beta limiter 204 is then computed at OR gate 242 to generate the feather command.

Figure 4:
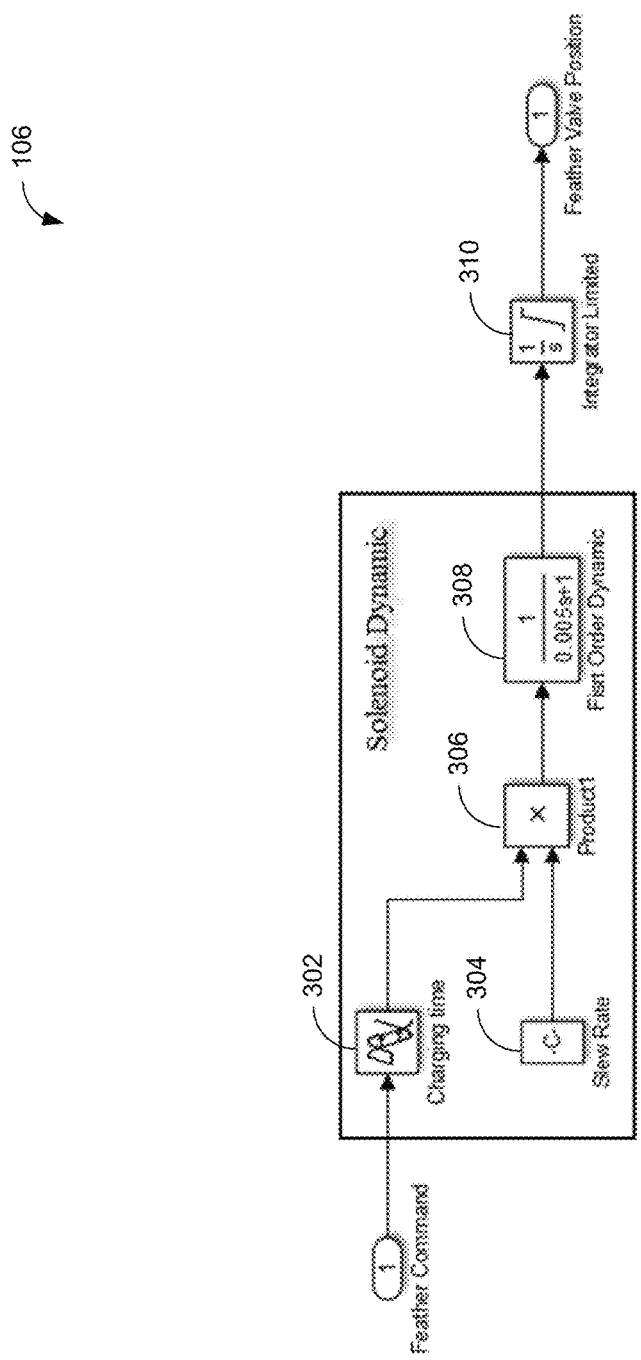
FIG. 4 is a block diagram of the feather valve model unit of FIG. 2.

Referring now to FIG. 4, the feather valve model unit 106 illustratively comprises a solenoid dynamic unit 302, which uses the feather valve dynamics, particularly dynamics of a feather solenoid (not shown) associated with the feather valve (reference 102 in FIG. 2), to estimate the current position of the feather valve 102. As understood by those skilled in the art, the feather valve 102 indeed comprises a feather solenoid that is energizable (e.g. through a pulse width modulating signal) to actuate the feather valve 102. In particular, once a feather command is generated, the feather solenoid is energized after a certain period of time (i.e. a given charging time). The feather solenoid then moves the feather valve and undergoes inertia.

The solenoid dynamic unit 302 thus takes the feather command generated by the ON-OFF pulse controller unit 104 as input and feeds the feather command to a charging time unit 302. The charging time unit 302 is provided to take into account the time required to energize the feather solenoid, subsequent to the feather valve (reference 102 in FIG. 2) command being output. A slew rate computation unit 304 is also provided to take into account the slew rate of the feather valve 102 (i.e. the rate at which the feather valve 102 spools once actuated). The output of the slew rate computation unit 304 is multiplied by the output of the charging time unit 302 at a multiplier 306. A first order dynamic unit 308 is provided to take into account the inertia of the feather solenoid after energization thereof. The first order dynamic unit 308 receives the output of the multiplier 306 and computes the transient slew rate, which is in turn fed to an integrator module 310. The output of the integrator module 310, which is the estimate of the current feather valve position, is fed back to pitch lock logic unit 206 of the ON-OFF pulse controller unit 104. As discussed above, the current feather valve position may be used by the ON-OFF pulse controller unit 104 to generate a new feather command that will cause the feather valve 102 to be held at the pitch lock position.

Figure 5:
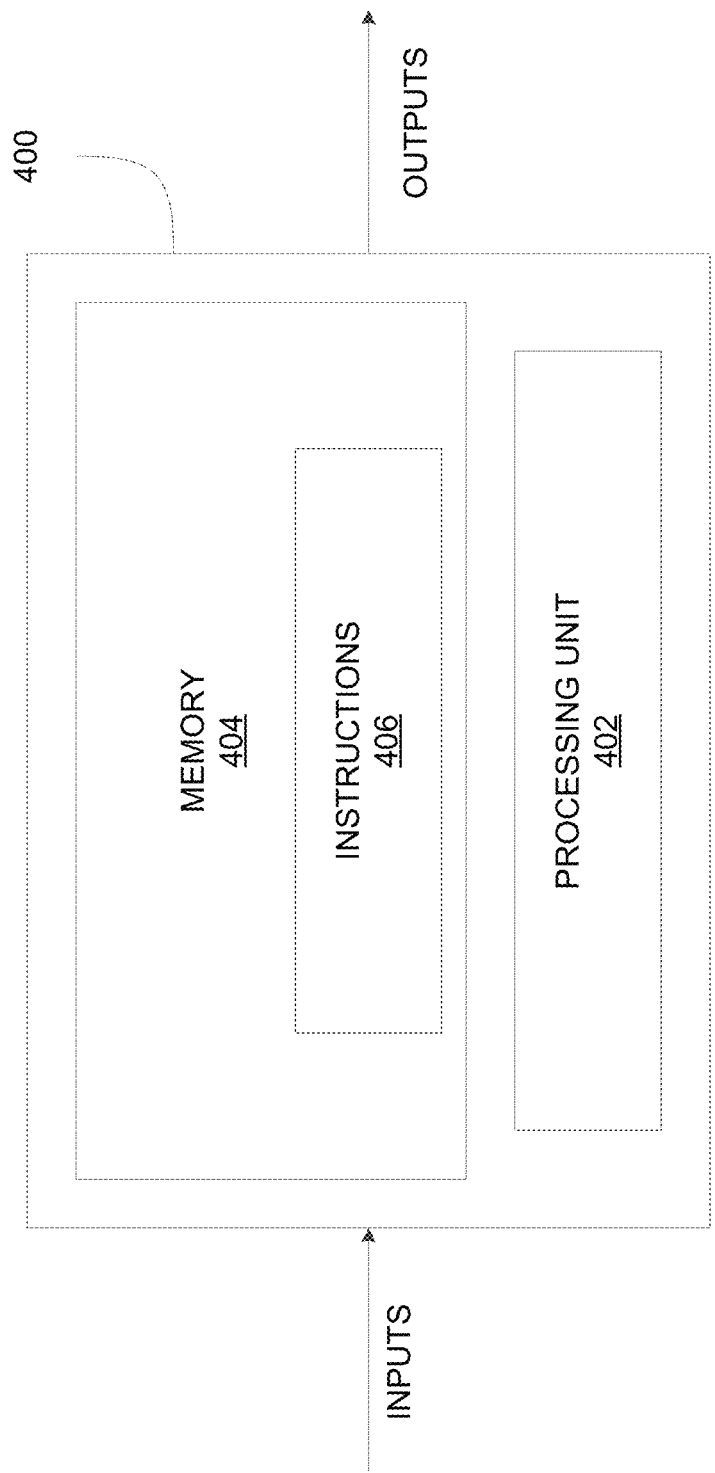
FIG. 5 is a block diagram of a computing device for implementing the controller of FIG. 2, in accordance with an illustrative embodiment.

FIG. 5 is an example embodiment of a computing device 400 for implementing the control system 100 described above. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 6:
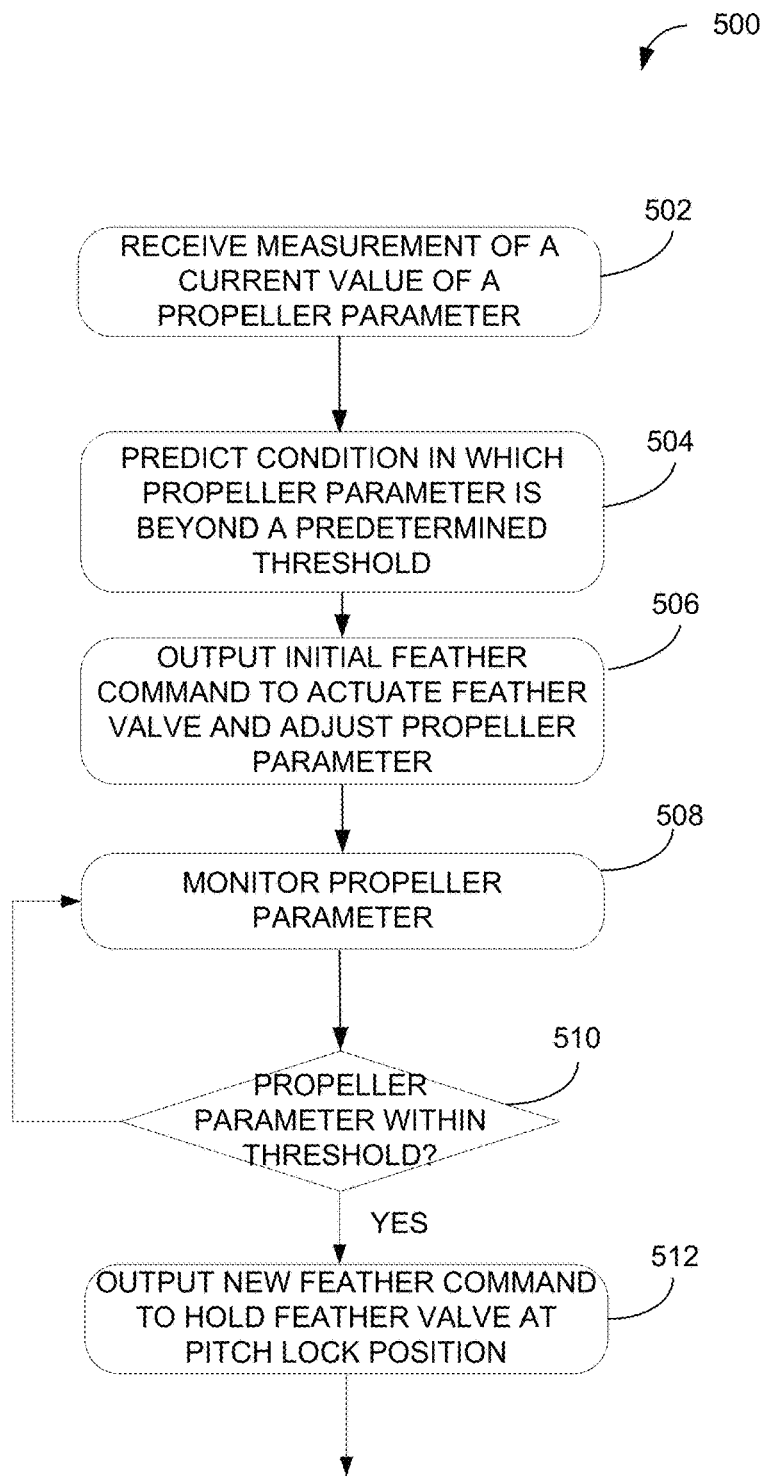
FIG. 6 is a flowchart of a method for controlling an aircraft propeller, in accordance with an illustrative embodiment.

Referring now to FIG. 6, an example method 500 for controlling an aircraft propeller will now be described. The method 500 may be implemented by the computing device 400 of FIG. 5. the method 500 comprises, at step 502, receiving a measurement of a current value of a propeller parameter (e.g. propeller speed or blade angle). The next step 504 is to predict a condition in which the propeller parameter reaches a value beyond a predetermined threshold. As discussed above, this may be achieved by computing the expected rate of change of the propeller parameter and compare the predicted rate of change to the threshold to assess whether the parameter is expected to be beyond the threshold. An initial feather command is then output at step 506 to actuate the feather valve and accordingly adjust the blade angle, thereby causing the propeller parameter to be adjusted towards the threshold. The propeller parameter is then monitored at step 508 and at step 510 it is assessed whether the propeller parameter is within the threshold. If this is not the case, the method 500 flows back to the step 508 of monitoring the propeller parameter. If it is determined at step 510 that the propeller parameter is within the threshold, a new feather command is output at step 512 to cause the feather valve to be held at the pitch lock position, thereby preventing further adjustment of the blade angle.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for controlling an aircraft propeller, the system comprising:
   an actuator for adjusting an angle of a plurality of blades of the aircraft propeller in response to hydraulic pressure;
   a feather valve operatively coupled to the actuator and configured to selectively provide the hydraulic pressure to the actuator;
   a memory; and
   a processing unit coupled to the memory and configured to:
      compute a rate of change of a propeller parameter related to the angle and predict, based on the rate of change as computed, a condition in which the parameter reaches a value beyond a predetermined threshold,
      output, in anticipation of the condition as predicted, a first control signal comprising instructions to actuate the feather valve, thereby causing adjustment of the angle and of the parameter towards the threshold, and when the parameter reaches the threshold, output a second control signal comprising instructions to hold the feather valve at a position in which the hydraulic pressure is withheld from the actuator, thereby causing the angle to remain unchanged.

2. The system of claim 1, wherein the feather valve is operatively coupled to a servo valve disposed in selective fluid communication with the actuator, the feather valve moveable between a first position in which the feather valve allows fluid flow from the servo valve to the actuator, thereby providing the hydraulic pressure, and a second position in which the feather valve restricts the fluid flow, thereby withholding the hydraulic pressure.

3. The system of claim 1, wherein the processing unit is configured to:
receive a measurement of a current value of the parameter;
compute the rate of change of the parameter on the basis of the measurement;
compare the computed rate of change to the threshold; and
predict the condition if the computed rate of change is beyond the threshold.

4. The system of claim 1, wherein the processing unit is configured to output the first control signal in anticipation of the condition in which a propeller speed exceeds a predetermined speed threshold.

5. The system of claim 1, wherein the processing unit is configured to output the first control signal in anticipation of the condition in which the angle is below a predetermined angle threshold.

6. The system of claim 1, wherein the processing unit is configured to output each of the first control signal and the second control signal as a bandwidth modulating signal to a feather solenoid energizable to actuate the feather valve.

7. The system of claim 1, wherein the processing unit is configured to apply a feather valve model to estimate a current position of the feather valve in response to the first control signal, the feather valve model representative of dynamics of the feather valve, and to generate the second control signal for causing the feather valve to be moved from the current position to the position in which the hydraulic pressure is withheld from the actuator.

8. The system of claim 1, wherein the processing unit is configured to receive from a sensor a position feedback signal comprising a measurement of a current position of the feather valve in response to the first control signal, and to generate the second control signal for causing the feather valve to be moved from the current position to the position in which the hydraulic pressure is withheld from the actuator.

9. A method for controlling an aircraft propeller having a plurality of blades, the propeller comprising an actuator for adjusting an angle of the plurality of blades in response to hydraulic pressure and a feather valve operatively coupled to the actuator and configured to selectively provide the hydraulic pressure to the actuator, the method comprising:
computing a rate of change of a propeller parameter related to the angle and predicting, based on the rate of change as computed, a condition in which the parameter reaches a value beyond a predetermined threshold;

outputting, in anticipation of the condition as predicted, a first control signal comprising instructions to actuate the feather valve, thereby causing adjustment of the angle and of the parameter towards the predetermined threshold; and
when the parameter reaches the threshold, output a second control signal comprising instructions to hold the feather valve at a position in which the hydraulic pressure is withheld from the actuator, thereby causing the angle to remain unchanged.

10. The method of claim 9, further comprising:
receiving a measurement of a current value of the parameter;
computing the rate of change of the parameter on the basis of the measurement;
comparing the computed rate of change to the threshold; and
predicting the condition if the computed rate of change is beyond the threshold.

11. The method of claim 9, wherein the first control signal is output in anticipation of the condition in which a propeller speed exceeds a predetermined speed threshold.

12. The method of claim 11, further comprising receiving from a sensor a position feedback signal comprising a measurement of a current position of the feather valve in response to the first control signal and generating the second control signal for causing the feather valve to be moved from the current position to the position in which the hydraulic pressure is withheld from the actuator.

13. The method of claim 9, wherein the first control signal is output in anticipation of the condition in which the angle is below a predetermined angle threshold.

14. The method of claim 9, wherein each of the first control signal and the second control signal is output as a bandwidth modulating signal to a feather solenoid energizable to actuate the feather valve.

15. The method of claim 9, further comprising applying a feather valve model to estimate a current position of the feather valve in response to the first control signal, the feather valve model representative of dynamics of the feather valve, and generating the second control signal for causing the feather valve to be moved from the current position to the position in which the hydraulic pressure is withheld from the actuator.

16. A non-transitory computer readable medium having stored thereon program code executable by a processor for:
computing a rate of change of a propeller parameter related to an angle of a plurality of blades of an aircraft propeller and predicting, based on the rate of change as computed, a condition in which the parameter reaches a value beyond a predetermined threshold;
outputting, in anticipation of the condition as predicted, a first control signal comprising instructions to actuate a feather valve operatively coupled to an actuator configured to adjust the angle in response to hydraulic pressure, thereby causing the feather valve to provide the hydraulic pressure to the actuator and the angle to be adjusted for bringing the parameter towards the threshold; and
when the parameter reaches the predetermined threshold, outputting a second control signal comprising instructions to hold the feather valve at a position in which the hydraulic pressure is withheld from the actuator, thereby causing the angle to remain unchanged.

* * * * *